United States Patent
Ingerhed et al.

(10) Patent No.: US 9,807,318 B2
(45) Date of Patent: Oct. 31, 2017

(54) IR CAMERA AND METHOD FOR PROCESSING THERMAL IMAGE INFORMATION

(71) Applicant: FLIR SYSTEMS AB, Taby (SE)

(72) Inventors: Malin Ingerhed, Linköping (SE); Göran Rohlin, Uppsala (SE)

(73) Assignee: FLIR Systems AB (SE)

( * ) Notice: Subject to any disclaimer, the term of this patent is extended or adjusted under 35 U.S.C. 154(b) by 1130 days.

(21) Appl. No.: 13/856,408

(22) Filed: Apr. 3, 2013

(65) Prior Publication Data

US 2013/0222604 A1     Aug. 29, 2013

Related U.S. Application Data

(63) Continuation of application No. PCT/EP2011/004936, filed on Oct. 4, 2011.

(30) Foreign Application Priority Data

Oct. 4, 2010 (SE) ...................................... 1051031
Mar. 28, 2011 (EP) .................................... 11159938
Oct. 4, 2011 (WO) ................ PCT/EP2011/004936

(51) Int. Cl.
| | |
|---|---|
| *H04N 5/33* | (2006.01) |
| *H04N 19/63* | (2014.01) |
| *H04N 19/132* | (2014.01) |
| *H04N 19/137* | (2014.01) |
| *H04N 19/152* | (2014.01) |
| *H04N 19/162* | (2014.01) |
| *H04N 19/18* | (2014.01) |
| *H04N 19/507* | (2014.01) |

(52) U.S. Cl.
CPC ............. *H04N 5/33* (2013.01); *H04N 19/132* (2014.11); *H04N 19/137* (2014.11); *H04N 19/152* (2014.11); *H04N 19/162* (2014.11); *H04N 19/18* (2014.11); *H04N 19/507* (2014.11); *H04N 19/63* (2014.11)

(58) Field of Classification Search
CPC ........ H04N 5/33; H04N 19/63; H04N 19/132; H04N 19/507; H04N 19/152; H04N 19/162; H04N 19/18; H04N 19/137
See application file for complete search history.

(56) References Cited

U.S. PATENT DOCUMENTS

| | | | |
|---|---|---|---|
| 6,008,848 A | 12/1999 | Tiwari et al. | |
| 6,393,056 B1 * | 5/2002 | Talluri | H04N 5/23293 348/E5.047 |
| 6,643,405 B1 * | 11/2003 | Sako | H04N 1/33307 348/E5.086 |
| 7,076,108 B2 | 7/2006 | Huang et al. | |

(Continued)

FOREIGN PATENT DOCUMENTS

WO    WO 2006/031737 A2    3/2006

*Primary Examiner* — Tat Chio
(74) *Attorney, Agent, or Firm* — Haynes and Boone, LLP

(57) ABSTRACT

A method for processing information from an IR detector of an IR camera, for an embodiment, comprises receiving a series of frames of data from said IR detector being operable to detect IR radiation from a scene, said frames of IR data representing detected IR radiation; performing a compression of said frames of IR data; wherein each data value together with calibration data uniquely represents measured IR radiation from the scene.

28 Claims, 3 Drawing Sheets

(56) References Cited

U.S. PATENT DOCUMENTS

| | | | | |
|---|---|---|---|---|
| 7,620,265 B1* | 11/2009 | Wolff | .................. | G06T 5/50 |
| | | | | 382/254 |
| 2003/0002734 A1* | 1/2003 | Islam | .................. | H04N 19/63 |
| | | | | 382/166 |
| 2004/0109059 A1 | 6/2004 | Kawakita | | |
| 2009/0097764 A1* | 4/2009 | Sung | .................. | H04N 19/172 |
| | | | | 382/239 |
| 2010/0119166 A1* | 5/2010 | Puetter | .................. | G06T 9/00 |
| | | | | 382/233 |

* cited by examiner

IR CAMERA AND METHOD FOR PROCESSING THERMAL IMAGE INFORMATION

CROSS-REFERENCE TO RELATED APPLICATIONS

This continuation patent application claims the benefit of and priority to PCT Patent Application No. PCT/EP2011/004936 filed Oct. 4, 2011, which claims the benefit of and priority to EP Patent Application No. 11159938.7 filed Mar. 28, 2011 and SE Patent Application No. 1051031-1 filed Oct. 4, 2010, all of which are incorporated herein by reference in their entirety. The EP Patent Application No. 11159938.7 filed Mar. 28, 2011 claims the benefit of and priority to SE Patent Application No. 1051031-1 filed Oct. 4, 2010.

TECHNICAL FIELD

The present invention relates generally to a method and an IR camera for processing thermal information. More particularly, the present invention relates to a method for compressing thermal (IR) information from an IR detector of an IR camera.

BACKGROUND

Infrared (IR) thermal came as can be used in a vast number of different situations, for example, when inspecting or surveying buildings or complex electrical systems, such as transformers, switchgears, etc., or water carrying systems such as heat exchangers, radiators, etc. IR cameras are used for capturing thermal information in an imaged view. Radiometric information based on this captured thermal radiation may then be displayed and viewed as thermal images on a display and may also be stored in the IR camera and subjected to subsequent analysis in order to, for example, detect faulty electrical wirings or couplings, leaking water pipes, or temperature deviations within a specific application.

Today, most of the analysis of the thermal images is performed by the user of the IR camera either on site by viewing the thermal images displayed live on the display or later on by storing the thermal images in the IR camera. In the case of performing a later analysis, the IR camera is generally arranged to store a number of still images or a video sequence of images in a memory unit or similar or to transmit images to a separate storage unit. The storage speed for storing a number of images in this manner is limited and it is a clear disadvantage for the user of the IR camera not to be able to store images at a desired speed, thus risking the loss of data. By compressing images that are displayed to a user of the system to reduce the amount of data for storage at each point in time, a higher number of images can be stored, but significant amount of information are generally lost through the compression, rendering detailed analysis difficult.

Another factor limiting the performance and storage capacity of an IR camera are system parameters such as the resolution or frame rate of detector elements used for detecting thermal radiation or transmission bandwidths between components within the camera itself or between the camera and a storage unit.

A problem in prior art, however, is to perform such processes without losses that render the resulting data insufficient for detailed analysis. When using video compression techniques are described for partitioning images into categories for different compression depending on similarities to other images of a sequence, but no efficient compression suited to properties of the IR camera system itself can be presented.

There is, therefore, a need for a more efficient processing of thermal information from an IR camera to overcome the difficulties outlined above.

SUMMARY

One or more embodiments of the present invention may overcome or at least minimize the problems described above. This is achieved through a method for processing information according to the appended independent claims, where IR images are subjected to calibration operations and are compressed so that a series of radiometric IR images can be achieved after a subsequent decompression. Thereby, radiometric properties of the images are preserved and losses due to compression can be kept to a minimum, which is very beneficial for subsequent analyses of the IR images after a decompression has been performed on the compressed IR images. The calibration operations can be performed before the compression or after a decompression, and renders the images radiometric so that detailed analysis can be performed.

According to aspects of the invention, thermal information from an IR detector of an IR camera, and a method for processing information from an IR detector of an IR camera, may comprise receiving a series of frames of data from said IR detector being operable to detect IR radiation from a scene, said frames of IR data representing detected IR radiation; and performing a compression of said frames of IR data; wherein each data value together with calibration data uniquely represents measured IR radiation from the scene.

Further aspects of the invention may comprise storing said compressed IR frames of IR data in a memory. A useful application enabled by the invention is to store large amounts of IR data, which is significantly less memory space consuming compared to storing compressed image data based on displayable images.

Further aspects of the invention may comprise performing a decompression of said frames of IR data, wherein each data value together with calibration data uniquely represents measured IR radiation from the scene. The decompression can for example take place in an IR camera or in a separate processing unit.

Further aspects of the invention may comprise transforming decompressed calibrated IR data values of said frames of IR data to a color space to obtain a series of displayable IR images. This transformation is performed when displayable IR images that are perceptible to a human user is needed. Typically the transformation to a color space is non-reversible, in the sense that radiometric IR data is lost for example by losing resolution, or by truncation of ranges of data, or by a non-unique mapping of data values to color.

Further aspects of the invention may comprise performing data analysis or other operations on decompressed IR data.

Further aspects of the invention may comprise performing calibration operations on said series of IR data frames in order to render said IR data frames radiometric, thereby obtaining a series of calibrated frames of IR data with a unique mapping between the data values and the corresponding measured IR radiation from the scene. The calibration operations are optionally performed before compression or after decompression. When calibration is performed before compression, the compression and decompression is preferably performed such that the radiometric properties of the uncompressed calibrated IR data frames are substantially maintained after compression and decompression, i.e. the frames of decompressed calibrated IR data have a unique mapping between the data values and the corresponding measured IR radiation. By the expression substantially maintained is here understood that every measurement value or detected IR data value shall map to only one temperature value. However, each temperature value may be represented by a plurality of close values dependent on predetermined requirements on measurement accuracy. Some loss of resolution in the order of a few bits is acceptable, but unique mapping should be maintained.

The meaning of the expression radiometric properties of the frames is that the frames of decompressed calibrated IR data have a unique mapping between the data values and the corresponding measured IR radiation from the scene Further aspects of the invention may comprise the concept that compression and/or decompression comprises applying video compression techniques on frames of IR data. That is video compression techniques are applied on non-image data.

Further aspects of the invention may include enabling different orders of performing calibration comprising:
a) receiving a series of frames of data from an IR detector operable to detect IR radiation from a scene;
b) performing calibration operations on said series of IR data frames in order to render said IR data frames radiometric, thereby obtaining a series of calibrated frames of IR data with a unique mapping between the data values and the corresponding measured IR radiation from the scene;
c) performing a compression of said calibrated IR data frames to yield a series of compressed calibrated IR data frames in such a way that a corresponding decompression of the compressed calibrated IR data frames can be performed, and
d) performing decompression of said compressed calibrated IR data frames arriving at a series of calibrated IR data frames.

Optionally, aspects may include further transforming the decompressed calibrated IR data values to a color space to obtain a series of displayable IR images.

Another order of performing calibration comprises:
The method may comprise:
a) receiving a series of frames of data from an IR detector operable to detect IR radiation from a scene;
b) performing a compression of said calibrated IR data frames to yield a series of compressed calibrated IR data frames in such a way that a corresponding decompression of the compressed calibrated IR data frames can be performed,
c) performing decompression of said compressed calibrated IR data frames arriving at a series of calibrated IR data frames with substantially maintained radiometric properties, i.e. the frames of decompressed calibrated IR data have a unique mapping between the data values and the corresponding measured IR radiation from the scene;
d) performing calibration operations on said series of IR data frames in order to render said IR data frames radiometric, thereby obtaining a series of calibrated frames of IR data with a unique mapping between the data values and the corresponding measured IR radiation from the scene.

Further aspects may optionally comprise transforming the decompressed calibrated IR data values to a color space to obtain a series of displayable IR images.

Another aspect of the invention comprises a method for processing information from an IR camera, comprising:
a) receiving a series of IR images in the form of data from an IR sensor,
b) performing calibration operations on said series of IR images in order to render said IR images radiometric
c) performing a compression of said IR images to yield a series of compressed IR images in such a way that a corresponding decompression of the compressed IR images can be performed, and
d) after performing the steps a), b) and c) arriving at a series of radiometric IR images.

Further aspects may optionally comprise a selection of:
wherein step b) is performed before step c); or
wherein step b) is performed after step c).

Further aspects may optionally comprise:
analyzing a first image belonging to said series of IR images;
performing a first compression according to a first compression method on said first image to achieve an intermediate image with a first compression ratio dependent on information from the preceding step;
determining a second compression ratio dependent on a combined compression ratio, said combined compression ratio comprising said first compression ratio and said second compression ratio, and
performing a second compression according to a second compression method on said first image to achieve said compressed image with the second compression ratio dependent on information from the preceding step, wherein said combined compression ratio is dependent on at least one system parameter.

Further aspects may optionally comprise a selection of:
wherein said system parameter is a transmission bandwidth.
wherein said system parameter is a property of a memory unit.
wherein said combined compression ratio is determined by a combined compression ratio of at least one other image belonging to the series.
wherein said combined compression ratio is a preset value.
wherein said first compression is a video compression.

Optionally the method for an embodiment of the invention is performed by means of a processor in an IR camera, or by means of a processor in a processing unit receiving a series of frames of IR data representing detected IR radiation.

The invention further comprises embodiments in the form of:
An IR camera comprising an IR detector (5) operable to detect IR radiation from a scene and a processor (6) for processing information from the IR detector (5), said processor (6) being adapted to receiving a series of frames of data from the IR detector, said frames of IR data representing detected IR radiation; performing a compression of said frames of IR data; wherein each data value together with calibration data uniquely represents measured IR radiation from the scene.

The invention further comprises embodiments in the form of:
An IR camera comprising capture means (4, 5) for capturing an infrared image, processing means (6) for receiving and processing said image from said capture means and storage means (9) for storing said infrared image, wherein said processing means are arranged to perform calibration operations and to perform a compression of said image in such a way that said images after a corresponding decompression are radiometric images.

The invention further comprises embodiments in the form of:

An IR camera wherein said processing means are further arranged to determine at least one system parameter of said IR camera (1) and determine a combined compression ratio depending on said system parameter and further being arranged to perform a first compression and second compression on an infrared image in such a way that a second compression ratio of said second compression is determined by a first compression ratio of said first compression and by said combined compression ratio.

The invention further comprises embodiments in the form of:

A computer program product for use in a processor (6) of an IR camera (1) comprising code portions adapted to perform the method steps and functions of the invention.

The invention further comprises embodiments in the form of:

A computer program product for use in a processor of a processing unit comprising code portions adapted to perform the method steps and functions of the invention.

According to an aspect of the invention, a first and a second compression are performed in such a way that a combined compression ratio determined by at least one system parameter is achieved. Thereby, the combined compression ratio can be set to fit each IR camera in particular, depending on a current stage of said camera, and serving to compress images captured by said camera enough to allow for a safe and reliable storage and transmission but not so much as to severely lose resolution or radiometry of said images. The combined compression ratio can also be altered depending on a state of components and available transmission bandwidths or memory unit capacity at the present moment or can be a preset value or chosen by a user to suit requirements of each situation where the camera is to be used separately.

According to an aspect of the invention, the combined compression ratio can be determined by a combined compression ratio of at least one other image belonging to a series of images. Thereby, the combined compression ratio of each image can be altered so that some images are compressed to a higher ratio while others are compressed to a lower ratio, depending on what is deemed suitable to minimize losses, among others.

The first and second compression used for processing images can be a video compression and an image compression, respectively. Thereby, through video compression a first compression ratio can be achieved and an additional image compression performed to arrive at the combined compression ratio. Preferably, the image compression is a wavelet transform compression using a suitable wavelet function or another suitable transform such as a cosine transform.

Many other advantages and aspects of the invention are described further below and will be easily realized by the person skilled in the art.

BRIEF DESCRIPTION OF THE DRAWINGS

One or more embodiments of the invention will now be described in more detail with reference to the appended drawings, wherein.

DETAILED DESCRIPTION

Figure 1:
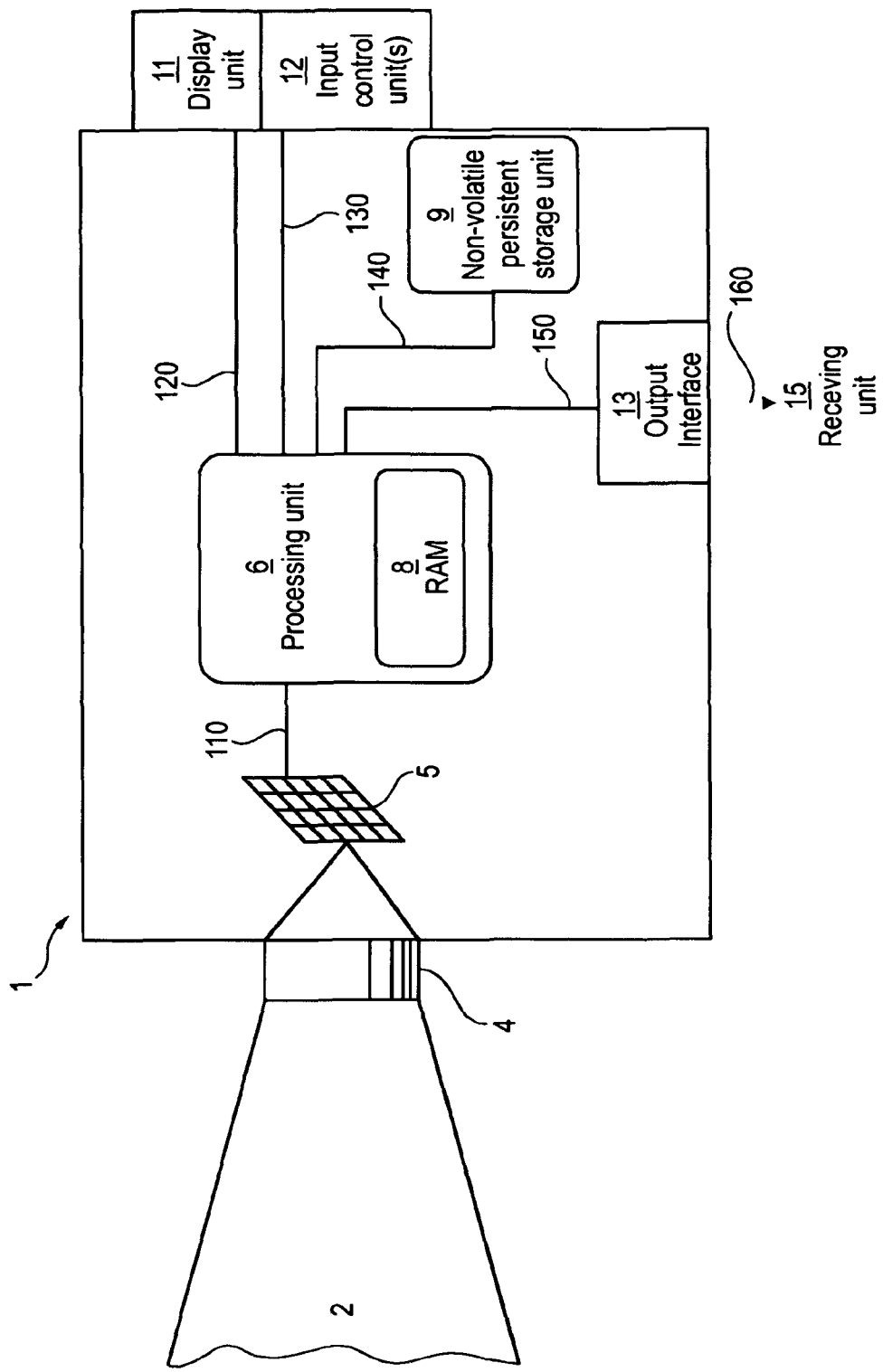
FIG. 1 shows a schematic view of an infrared (IR) camera according to an embodiment of the invention.

In FIG. 1, an infrared (IR) camera 1 suitable for capturing thermal radiation in the form of infrared images is shown. Said images are generally captured in the form of a sequence of images taken at a predetermined frame rate to form a video sequence as a response to input from a user utilizing an input control unit 12 and are stored for subsequent analysis as well as displayed directly in a display unit 11 to be viewed by the user. The camera 1 can be a hand-held camera but can also be one that is operated by a holding device such as a robot arm or be a stationary camera, and the input control unit 12 and display unit 11 can be placed at a remote location and communicate with the camera 1 through a suitable communication link.

Each of said images is captured through capture means 4, 5 comprising a lens assembly 4 focusing thermal radiation from an image scene 2 onto a detector element 5 to form an image according to an available resolution of said detector element 5. The detector element 5 may typically be a focal plane array (FPA) forming a matrix of detector elements, each of which may detect radiation from an area of the image scene 2 and can be arranged to extract radiometric information from the thermal radiation.

The term radiometric is to be understood herein as a unique mapping between a data value of each pixel of an image and a temperature of an object as measured by a detector element 5 of the camera 1. A measured temperature in this context corresponds to measured radiation from a scene. A detector element is also referred to as IR sensor or an IR detector. Thus, each data value comprised in a radiometric IR image corresponds to one and only one temperature value of an object scene 2.

In this context an IR image is a frame of data that is a two dimensional array of measurement values being output from thermistor in an IR sensor, also known as an IR detector. This is also referred to as an IR image in the form of data from an IR sensor, where the IR image holds radiometric data and is not in a displayable form that is perceptible by human users.

Calibration data, e.g. in the form of calibration map(s), takes account of a non-linear individual offset of each thermistor in an IR detector. Such calibration data or calibration maps are unique for each individual detector. In a per se known manner, calibration is used to remove noise from background radiation and radiation from the IR camera itself. The useful measurement radiation typically amounts to about 10% of the total detected radiation.

Figure 3:
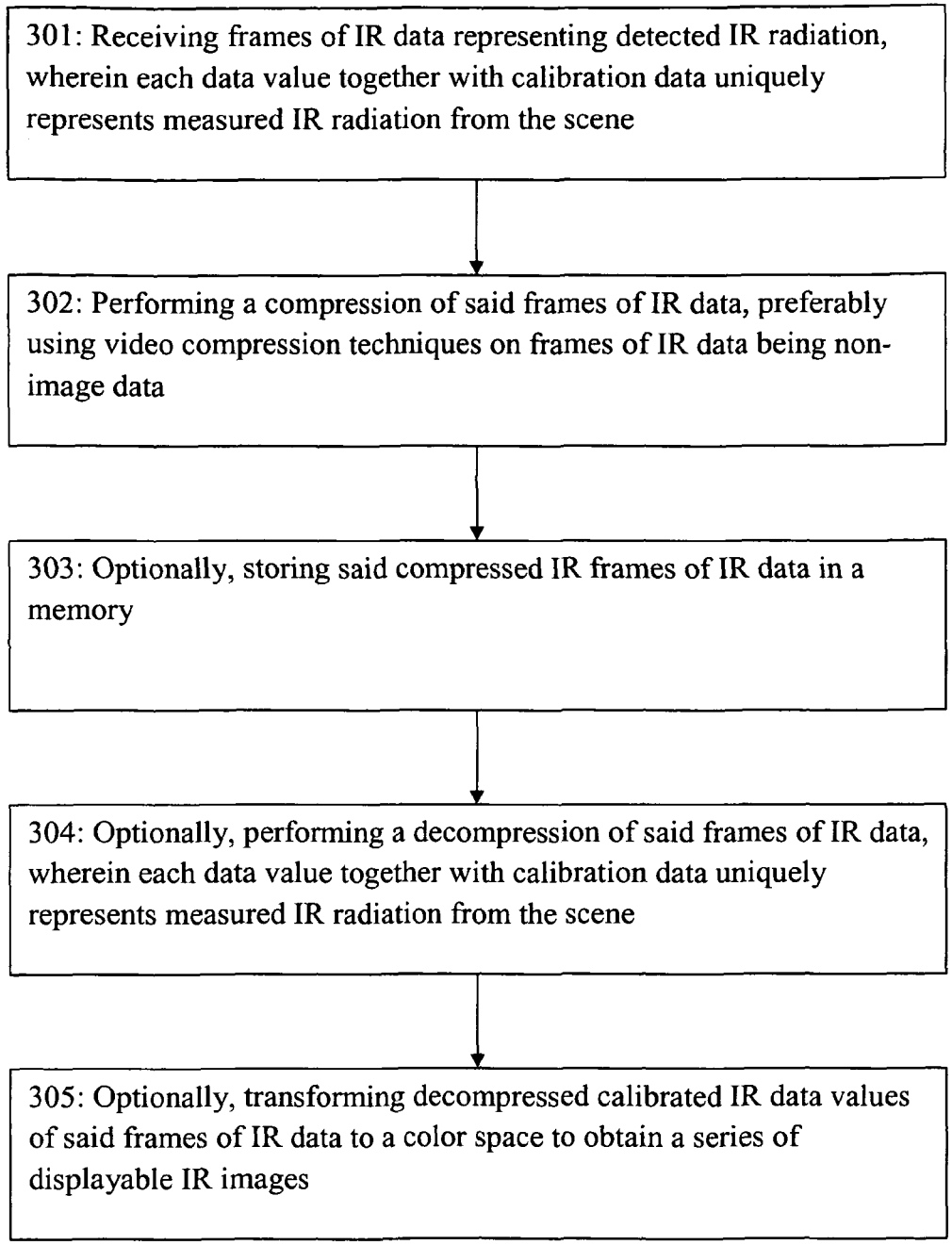

FIG. 3 shows schematically the steps of the method and functions implemented in an IR camera or a separate processing unit according to an embodiment of the invention, i.e. a method for processing information from an IR detector of an IR camera, comprising the steps:

301: Receiving frames of IR data representing detected IR radiation, wherein each data value together with calibration data uniquely represents measured IR radiation from the scene. This may also be expressed as receiving a series of frames of data from said IR detector being operable to detect IR radiation from a scene, said frames of IR data representing detected IR radiation.

302: Performing a compression of said frames of IR data, preferably using video compression techniques on frames of IR data being non-image data, wherein each data value together with calibration data uniquely represents measured IR radiation from the scene.

303: Optionally, storing said compressed IR frames of IR data in a memory

304: Optionally, performing a decompression of said frames of IR data,
wherein each data value together with calibration data uniquely represents measured IR radiation from the scene.

304: Optionally, performing a decompression of said frames of IR data,
wherein each data value together with calibration data uniquely represents measured IR radiation from the scene.

305: Optionally, transforming decompressed calibrated IR data values of said frames of IR data to a color space to obtain a series of displayable IR images.

The captured image is transmitted as at least one signal to a processing unit 6, comprising processing means and means such as an FPGA, DSP or similar device for subsequent processing and short time storage in a volatile buffering unit 8, generally a RAM (Random Access Memory) unit. Said processing unit 6 is arranged to perform calibration operations as well as conventional signaling conditioning such as corrections for an inherent offset, gain drift, etc., but also to prepare a received image for display to the user in a display unit 11, to react to input control signals given by the user via at least one input control unit 12, and to process the image according to method steps of the preferred embodiment of the invention.

By said processing according to the method steps which will be described in detail further below, the image is compressed for efficient storage in a non-volatile persistent storage unit 9, typically a memory card or similar, and/or for transmission of the image via an output interface 13 to a separate receiving unit 15 through suitable transmission means 14.

The general operation of the IR camera 1 according to one or more embodiments of the invention will now be described.

A series of original IR images forming a video sequence are captured by the lens assembly 4 and detector elements 5 according to a selected frame rate and are transmitted via a first transmission link 110 to the processing unit 6. An original image is processed according to a suitable method for allowing a display in the display unit 11, generally forming an adapted image by adapting radiometric data of the original image to a chosen palette in such a way that a particular level of thermal radiation corresponds to a particular nuance of color or a tone of grey in a grey scale palette. During this process, losses generally occur in an adapted image through a compression where linear or radiometric properties of the original image are lost, so that each pixel value of the image does not correspond to a unique temperature at the object scene 2, or through the need to adapt the radiometric data to a number of color nuances that can be seen by a human eye. The original image captured by the capture means 4, 5 comprises radiometric data, where detailed information regarding temperature data of each pixel of the original image is presented.

The adapted image is transmitted through a second transmission link 120 to the display unit 11 where it is shown to the user, who can react to it by generating input control signals into the input control unit 12, for instance. Such input control signals can start, interrupt or stop a saving of the original images of the video sequence, and in some embodiments mark a section of the adapted image as particularly interesting for saving at a higher resolution than a remainder of the image or adjusting a number of operation parameters. Such operation parameters may include the selected frame rate for capturing the original images, a combined compression rate of the original images according to the method steps of one or more embodiments of the invention as described below, among others. Input control signals are transmitted along a third transmission link 130 to the processing unit 6 where they can be used for controlling the operation of the camera 1.

In parallel to this process of adapting the original image for display to the user, the original image is also processed according to the steps of the method and thereby subjected to compression as described below to form a compressed image before transmission via a fourth transmission link 140 to the non-volatile persistent storage unit 9 where each image of the video sequence is stored for further analysis at a later time. The compressed image can also be transmitted via a fifth transmission link 150 to the output interface 13 and further along an external transmission link 160 to the receiving unit 15. By using the original image for compression and storage rather than the adapted image, the losses connected with the adaptation as described above can be avoided, conserving the radiometric data of the original image.

The processing unit 6 further comprises data regarding properties of the components 11, 12, 9, 13, 8, 4, 5 of the camera 1 and the transmission links 110, 120, 130, 140, 150 as well as data regarding properties of the external transmission link 160 and the receiving unit 15, such as the available bandwidths of each transmission link 110, 120, 130, 140, 150, 160 and a receiving capacity of each component, especially the storage unit 9 and output interface 13 that serve to receive and store images. It is advantageous if the processing unit 6 also has means for detecting changes to such properties during operation. Thereby, the processing unit 6 can adjust compression ratios and frame rate, among others, to what is suitable at the present moment and allow transmission and storage of images to be performed in a reliable and efficient manner without risking overflow or delays that could otherwise jeopardize operation of the camera 1.

Figure 2:
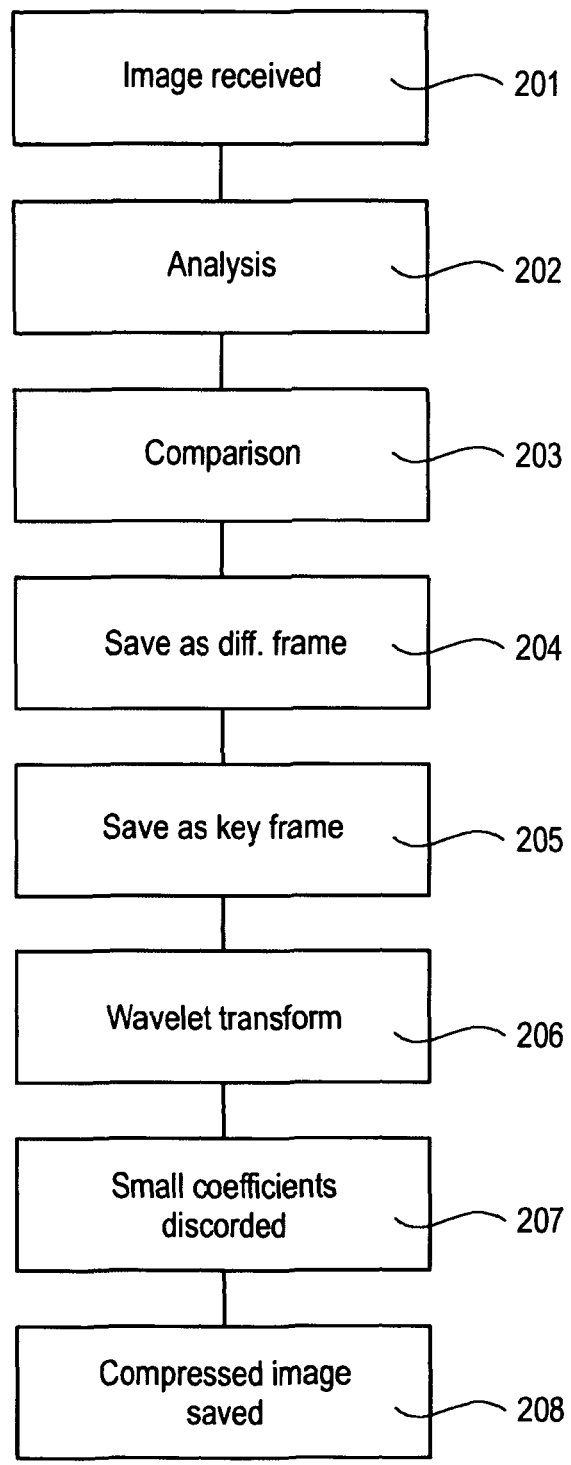
FIGS. 2 and 3 show schematic views of the method steps according to embodiments of the invention.

The steps of the method according to an embodiment of the invention will now be described in detail with reference to FIG. 2. In this description it is assumed that all the method steps are performed by the processing unit 6, but other configurations could also be used within the scope of the claims.

In a first step 201, an original image is received by the processing unit 6. Optionally, a first analysis is performed in a second step 202 to stabilize the original image by methods generally known in the art, compensating for movements of the camera 1 in relation to the object scene 2 or movements of objects present in the object scene 2 in relation to each other, among other things. Sensors placed in connection with the camera 1 can also serve to supply data for this step. A series of calibration operations are also performed in this second step 202, preferably before the stabilization mentioned above, in order to compensate for properties of each sensor element of the detector elements 5, the lens assembly 4 or other parts of the camera 1. Thereby, the captured images are rendered radiometric, so that each data unit of the images corresponds to a particular temperature of the image scene 2.

These calibration operations can be performed as a second step 202, before any compression of the images has taken place. Thereby, a stable output can be given from the camera 1 or stored at the camera 1 itself, without requiring further calibration after decompression. This is especially advantageous if a decompression is to take place at a remote unit, since that unit does not need access to calibration mappings for the specific detector elements 5 of the camera 1.

The calibration operations can also be performed after compression of the original image and decompression at the camera 1 or at an external unit, for instance for analysis. This is advantageous, since any delay from the detection at the detector elements 5 to the output of data from the camera 1 can be kept very small, which is very beneficial in applications within fields of research where quick analyses are to be performed.

A first compression in the form of a video compression of the original image according to a first compression method is now performed in steps 203-205. It is to be noted, however, that another suitable compression can alternatively be used within the scope of the claims.

In a third step 203, a comparison is performed between the original image and a previous image of the sequence serving as a key frame. A storage capacity required for storing only differences between the original image and the previous image is estimated, and compared to the storage capacity required to save the whole of the original image. If the storage capacity needed differs significantly, i.e. differs by more than a predetermined value, for instance more than 30%, the differences are denoted as a diff frame and saved as an intermediate image in a fourth step 204. If the storage capacity needed differs less than said predetermined value, the original image is instead denoted as a new key frame, replacing the previous image for comparison to subsequent images of the series, and is stored as an intermediate image in its present state in a fifth step 205.

In the event that a diff frame has been saved, a substantial compression has already taken place compared to the original image in that all data similar to that of the previous key frame has been discarded. In the event that a new key frame has been saved, no such substantial compression has yet been performed.

A comparison of the intermediate image and the original image can now be performed, yielding a first compression ratio.

A second compression in the form of an image compression (also known as frame compression) according to a suitable second compression method will now be performed in the following steps 206-208.

In a sixth step 206, the intermediate image is subjected to a wavelet transform using a suitable wavelet, such as for instance Haar. A number of wavelets are well-known in the art, and by choosing one that is well suited to the compression of infrared images a good result can be achieved. Other transforms, such as for instance cosine transforms, can also be well suited for use with the present invention. In some cases, it may also be convenient to create a new wavelet suitable for the present compression. In a seventh step 207, a further compression is performed by discarding coefficients smaller than a threshold value to achieve a second compression ratio of the image. The resulting compressed image is saved in an eight step 208 and can be transmitted to the storage unit 9 and/or to the output interface 13 for further transmission to the receiving unit 15.

The original image has now been subjected to two separate compression methods and the first and second compression ratios can be combined to form a combined compression ratio that can be a preset value or vary within an interval. In this embodiment, the second compression ratio can be determined as a difference between the combined compression ratio and the first compression ratio so that the second threshold value for each intermediate image is chosen to allow for a desired amount of coefficients to be discarded. Thereby, the compression performed on each image will correspond to the combined compression ratio in such a way that when a first compression ratio is small, the second compression ratio will be higher.

The combined compression ratio is determined based on at least one system parameter such as the transmission bandwidths or memory unit properties described above, and can also at least in part be chosen by the user or be preset by a manufacturer of the camera 1. It is beneficial to compress each original image enough to ascertain a swift transmission along each transmission link 140, 150, 160 but not so much that an excessive amount of data must be discarded in the compression process. Other system parameters that can be used to determine the combined compression ratio are the frame rate of the camera 1, an amount of data comprised in each original image or a reception speed of the storage unit 9 or the receiving unit 15. In the event that multiple system parameters are used for determining the combined compression ratio, parameters that are the most limiting for operation of the camera 1 are generally allowed to have the highest impact on the ratio.

It is to be noted that said first and second compression need not be performed in the order given above, and that either one of them or both may have a fixed compression ratio for each compression performed. Thus, it follows that the combined compression ratio may also be a set ratio dependent on a system parameter as described herein or preset by a manufacturer of the camera 1.

If each original image is to be compressed to the same compression ratio, it follows however that each image saved as a key frame and thereby compressed to a smaller first compression ratio must be compressed to a higher second compression ratio, which could lead to a loss in data since this second compression ratio can affect each following diff frame showing similarities to the key frame in question. To compensate for this phenomenon, the combined compression ratio can be an interval or can be allowed to differ for each image in such a way that an average combined compression ratio over a large number of images, for instance around 1000 images, corresponds to the determined combined compression ratio but that each individual image in an image sequence can have a higher or lower combined compression ratio depending on what is suitable for each image. To serve this end, the first and second threshold values can also be allowed to vary within an interval in such a way that the interval for determining whether an image is to be considered a diff frame or a key frame during video compression, and the threshold for which coefficients are to be discarded during image or frame compression cannot vary outside these intervals. Thereby it can be ascertained that losses due to an excessive discarding of coefficients, for instance, can be prevented. It can also be determined that an image denoted as a key frame is allowed a lower combined compression ratio than an image denoted as a diff frame.

It is beneficial to achieve a high first compression ratio, since the video compression described above has very low losses, but said first compression ratio cannot be guaranteed to amount to a predetermined value, due mainly to the difference between the compression of a key frame and a diff frame. The second compression ratio thus serves to compress each image further so that a desired combined compression ratio can be achieved.

The user can by using the input control unit 12 give an input control signal to further decrease the amount of data for compression and storage by the camera 1, for instance by determining that only every other original image or only a specific area within each original image is to be saved.

It is to be noted that the steps of the method need not be performed exactly as described with reference to this preferred embodiment but can be varied and/or be performed in different order within the scope of the appended claims. Not all steps described herein are necessary for performing the method according to the invention, but rather certain steps can be left out or performed differently within the scope of the claims. Also, one of the first and second compressions can have a compression ratio of 1, i.e. no compression of the image, as is indeed the case where an original image is denoted as a key frame and saved as such as an intermediate image as described above.

After a sequence of original images have been compressed and stored according to the method of the invention, they can be restored by a decompression to their original appearance for subsequent detailed analysis, either in the IR camera 1 itself or in a separate processing unit such as a computer, for instance. To decompress the compressed images, relevant steps of the method can be performed the other way around, so that the compressed image is transformed back again using the same wavelet and a saved diff frame is combined with data of a previous key frame to which the diff frame is similar. Thereby, the original image can be recreated with only small losses and radiometric properties of the original image can be restored to allow for a detailed and complex analysis of thermal data captured by the IR camera 1.

By using the first and second compression methods described above, the compression of the original image can be performed in a way that preserves linearity of data in the original image. Thereby the decompression will yield a decompressed image that retains important properties such as resolution from the original image, allowing for a detailed analysis without losing data. This is very beneficial since thanks to the invention images with radiometric properties can be stored in a highly efficient manner after compression and can be recreated by decompression with a very small loss of data, giving essentially the same possibilities for analysis as the original image, had it been stored without compression. Loss of data can thus be kept very low, thanks to one or more embodiments of the present invention, preferably for example lower than 0.5 degrees (Celsius or Kelvin).

According to an embodiment of the invention, a computer program product for performing the steps of the method is also provided, comprising code portions directing a data processing unit to perform each of the method steps described above.

Among the advantages of one or more embodiments of the invention is the possibility of storing large sequences of images while maintaining their radiometric properties, so that the user can record data for a long time without exceeding a capacity of the storage unit 9. In some IR cameras 1 according to the invention, several hours worth of images can be recorded in this manner. Another advantage is that, thanks to the use of system parameters for determining the combined compression ratio, bottlenecks where a decreased capacity of a single component within the camera 1 or a bandwidth in one transmission link severely limit the operation of the camera 1 as a whole can be avoided.

The invention is not to be seen as limited by the embodiments described above, but can be varied within the scope of the appended claims as will become readily apparent to the person skilled in the art. For instance, the IR camera can be configured and constructed in many ways as long as means for performing the method steps are present and can function as described herein, and the original images captured by the IR camera need not be a video sequence but can instead be single images captured at irregular points in time.

The invention claimed is:

1. A method for processing information from an infrared (IR) detector of an IR camera, the method comprising:
   receiving a series of frames of IR data values from said IR detector being operable to detect IR radiation from a scene, said frames of IR data representing detected IR radiation; and
   performing a compression of said frames of IR data values;
   wherein each received IR data value together with calibration data uniquely represents measured IR radiation from the scene, wherein calibration data comprises a unique mapping between the received IR data values and the corresponding measured IR radiation from the scene;
   wherein the compression substantially maintains a radiometric mapping of the received IR data values after compression and decompression to an original appearance of the received frames; and
   wherein the substantially maintained radiometric mapping maps every IR data value to only one temperature value but represents each temperature value by one IR data value or a plurality of adjacent IR data values.

2. The method of claim 1, further comprising storing said compressed IR frames of IR data values in a memory.

3. The method of claim 1, further comprising:
   performing a decompression of said frames of IR data values, wherein each IR data value together with calibration data uniquely represents measured IR radiation from the scene.

4. The method of claim 3, further comprising:
   transforming decompressed calibrated IR data values of said frames of IR data values to a color space to obtain a series of displayable IR images.

5. The method of claim 4, wherein the transformation to a color space is non-reversible.

6. The method of claim 3, further comprising performing data analysis or other operations on decompressed IR data values.

7. The method of claim 3, further comprising:
   performing calibration on said series of IR data values frames in order to render said IR data values frames radiometric, thereby obtaining a series of calibrated frames of IR data values with a unique mapping between the IR data values and the corresponding measured IR radiation from the scene.

8. The method of claim 7, wherein said calibration is performed before compression or after decompression.

9. The method of claim 8, wherein if the calibration is performed before compression, the compression substantially maintains the radiometric mapping at least by controlling a compression ratio of each frame of the IR data values to fall within a predetermined interval while an average compression ratio over a predetermined number of frames corresponds to a compression ratio determined based on at least one system parameter.

10. The method of claim 3, wherein compression and/or decompression comprises applying video compression techniques on frames of IR data values.

11. The method of claim 1, further comprising:
   a) receiving a series of frames of IR data values from an IR detector operable to detect IR radiation from a scene;

b) performing calibration operations on said series of IR data values frames in order to render said IR data values frames radiometric, thereby obtaining a series of calibrated frames of IR data values with the unique mapping between the IR data values and the corresponding measured IR radiation from the scene;

c) performing a compression of said calibrated IR data values frames to yield a series of compressed calibrated IR data values frames in such a way that a corresponding decompression of the compressed calibrated IR data values frames can be performed; and d) performing decompression of said compressed calibrated IR data values frames arriving at a series of calibrated IR data values frames.

12. The method of claim 11, further comprising transforming the decompressed calibrated IR data values to a color space to obtain a series of displayable IR images.

13. The method of claim 1, further comprising:

e) receiving a series of frames of IR data values from an IR detector operable to detect IR radiation from a scene;

f) performing a compression of said calibrated IR data values frames to yield a series of compressed calibrated IR data values frames in such a way that a corresponding decompression of the compressed calibrated IR data values frames can be performed;

g) performing decompression of said compressed calibrated IR data values frames arriving at a series of calibrated IR data values frames with the substantially maintained radiometric mapping, such that the frames of decompressed calibrated IR data values have the unique mapping between the IR data values and the corresponding measured IR radiation from the scene; and h) performing calibration operations on said series of IR data values frames in order to render said IR data values frames radiometric, thereby obtaining a series of calibrated frames of IR data values with the unique mapping between the IR data values and the corresponding measured IR radiation from the scene.

14. The method of claim 13, further comprising transforming the decompressed calibrated IR data values to a color space to obtain a series of displayable IR images.

15. A method for processing information from an IR camera, the method comprising:

a) receiving a series of IR images in the form of data from an IR sensor;

b) performing calibration operations on said series of IR images in order to render said IR images radiometric;

c) performing a compression of said IR images to yield a series of compressed IR images in such a way that a corresponding decompression of the compressed IR images can be performed; and d) after performing the steps a), b) and c) arriving at a series of radiometric IR images;

wherein the compression substantially maintains a radiometric mapping of the received IR data values after compression and decompression to an original appearance of the received series of IR images, and wherein the substantially maintained radiometric mapping maps every IR data value to only one temperature value but represents each temperature value by one IR data value or a plurality of adjacent IR data values.

16. The method according to claim 15, wherein step b) is performed before step c).

17. The method according to claim 15, wherein step b) is performed after step c).

18. The method according to claim 15, wherein said compression further comprises:

e) analyzing a first image belonging to said series of IR images;

f) determining a combined compression ratio;

g) performing a first compression according to a first compression method on said first image to achieve an intermediate image with a first compression ratio dependent on information from step e);

h) determining a second compression ratio as a difference between said combined compression ratio and said first compression ratio; and i) performing a second compression according to a second compression method with said second compression ratio on said intermediate image to achieve one of said compressed IR images.

19. The method of claim 18, wherein said system parameter is a transmission bandwidth.

20. The method of claim 18, wherein said system parameter is a property of a memory unit.

21. The method of claim 18, wherein said combined compression ratio is determined by a combined compression ratio of at least one other image belonging to the series.

22. The method of claim 18, wherein said combined compression ratio is a preset value.

23. The method of claim 18, wherein said first compression is a video compression.

24. The method of claim 18, wherein the method is performed by a processor in an IR camera.

25. The method of claim 18, wherein the method is performed by a processor in a processing unit receiving a series of frames of IR data representing detected IR radiation.

26. An IR camera, comprising:

an IR detector operable to detect IR radiation from a scene; and a processor operable to process information from the IR detector, said processor adapted to:

receive a series of frames of data from the IR detector, said frames of IR data representing detected IR radiation; and perform a compression of said frames of IR data;

wherein each data value together with calibration data uniquely represents measured IR radiation from the scene;

wherein the compression substantially maintains a radiometric mapping of the received IR data values after compression and decompression to an original appearance of the received frames; and wherein the substantially maintained radiometric mapping maps every IR data value to only one temperature value but represents each temperature value by one IR data value or a plurality of adjacent IR data values.

27. A non-transitory computer-readable medium encoding a computer program which, when executed by a processor of an IR camera, causes the processor to perform the method of claim 1.

28. A non-transitory computer-readable medium encoding a computer program which, when executed by a processor of an IR camera, causes the processor to perform the method of claim 15.

* * * * *